United States Patent
Latif

(10) Patent No.: US 12,047,103 B2
(45) Date of Patent: *Jul. 23, 2024

(54) WIRELESS CIRCUITRY DESENSITIZATION DETECTION

(71) Applicant: Apple Inc., Cupertino, CA (US)

(72) Inventor: Imran Latif, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,940

(22) Filed: Apr. 21, 2023

(65) Prior Publication Data

US 2023/0253998 A1 Aug. 10, 2023

Related U.S. Application Data

(63) Continuation of application No. 17/476,179, filed on Sep. 15, 2021, now Pat. No. 11,671,134.

(51) Int. Cl.
*H04B 1/12* (2006.01)
(52) U.S. Cl.
CPC ..................................... *H04B 1/12* (2013.01)
(58) Field of Classification Search
CPC ........................................................ H04B 1/12
See application file for complete search history.

(56) References Cited

U.S. PATENT DOCUMENTS

| | | |
|---|---|---|
| 6,130,907 A | 10/2000 | Chen |
| 6,560,445 B1 | 5/2003 | Fette et al. |
| 7,292,830 B1 * | 11/2007 | Cheung ............ H04B 17/345 |
| | | 375/345 |
| 8,699,614 B2 | 4/2014 | Haartsen |
| 8,891,700 B1 | 11/2014 | Kim et al. |
| 2002/0155811 A1 | 10/2002 | Prismantas et al. |
| 2004/0132410 A1 | 7/2004 | Hundal et al. |
| 2009/0304095 A1 | 12/2009 | Chauncey et al. |
| 2014/0105262 A1 | 4/2014 | Alloin et al. |
| 2019/0115949 A1 | 4/2019 | Kim et al. |
| 2020/0389206 A1 | 12/2020 | Dowla et al. |

FOREIGN PATENT DOCUMENTS

| | | |
|---|---|---|
| CN | 110927682 B | 6/2021 |
| KR | 101409099 B1 | 6/2014 |
| KR | 20160147975 A | 12/2016 |

* cited by examiner

*Primary Examiner* — Junpeng Chen
(74) *Attorney, Agent, or Firm* — Treyz Law Group, P.C.; Tianyi He

(57) ABSTRACT

An electronic device may include wireless circuitry having one or more radios and one or more antennas. The wireless circuitry may operate in the presence of radio-frequency interference coming from various sources, which can cause a loss of sensitivity or desensitization of the wireless circuitry. To detect and mitigate desensitization of the wireless circuitry, one or more processors may receive wireless circuitry performance metric data, discriminate between wideband interference and narrowband interference based on the wireless circuitry performance metric data, and use different representative noise floor values for wideband interference or narrowband interference to characterize the desensitization of the wireless circuitry.

20 Claims, 7 Drawing Sheets

WIRELESS CIRCUITRY DESENSITIZATION DETECTION

This application is a continuation of U.S. patent application Ser. No. 17/476,179, filed Sep. 15, 2021, which is hereby incorporated by reference herein in its entirety.

FIELD

This disclosure relates generally to electronic devices, including electronic devices with wireless circuitry.

BACKGROUND

Electronic devices are often provided with wireless capabilities. An electronic device with wireless capabilities has wireless circuitry that includes one or more antennas coupled to one or more radios.

The wireless circuitry often operates in an environment where sources of interference affecting the performance of the wireless circuitry exist. It can be challenging to properly characterize the interference and mitigate the effects of the interference on the wireless circuitry.

SUMMARY

An electronic device may include wireless circuitry having one or more radios and one or more antennas. The wireless circuitry can operate in the presence of one or more sources of radio-frequency interference such as an inadequately electromagnetically-shielded connector coupled to the electronic device and through which the conveyance of data occurs. Some of these types of interference may be persistent (while the connector is in operation or just present) and may be a wideband interference. In contrast, the wireless circuitry can also operate in the presence of one or more sources of intermittent and/or narrowband interference, which may be shorter in duration and affecting a smaller frequency band than the persistence and wideband interference.

In order to properly characterize a decrease (loss) in sensitivity or desensitization of the wireless circuitry caused by one or more types of interference, one or more processors may discriminate or discern between wideband interference and narrowband interference. In particular, the one or more processors may receive wireless circuitry performance metric data. Based on the performance metric data, the one or more processors may identify noise floor characteristics across different subsets (or bins) of channels in a plurality of radio-frequency channels. The noise floor characteristics may include a maximum noise floor value across the bins, a minimum noise floor value across the bins, an average noise floor value across the bins. Based on these noise floor characteristics, the one or more processors may discern between wideband interference and narrowband interference to characterize the desensitization of the wireless circuitry based on the type of interference, and consequently perform desensitization mitigation for the wireless circuitry only when needed. If desired, the one or more processors may identify a characteristic noise floor values depending on the presence of wideband interference or narrowband interference and use the characteristic noise floor value and additional historical characteristic noise floor values in a sliding time window to detect the desensitization.

An aspect of the disclosure provides an electronic device. The electronic device can include one or more antennas, a radio receiver configured to use the one or more antennas to receive radio-frequency signals across a plurality of channels, and one or more processors. The one or more processors can be configured to receive performance metric data associated with at least a portion of the plurality of channels, and detect desensitization of the radio receiver at least in part by discriminating between narrowband interference and wideband interference based on the performance metric data. The one or more processors can be configured to calculate noise floor values each associated with one or more channels in the plurality of channels based on the performance metric data and to compare a difference between a maximum noise floor value in the noise floor values and a minimum noise floor value noise floor values with a narrowband threshold value (sometimes referred to as a bandwidth threshold value) and discriminate between the narrowband interference and the wideband interference based on the comparison.

An aspect of the disclosure provides a method detecting radio-frequency interference of wireless circuitry. The method can include receiving, by one or more antennas of the wireless circuitry, radio-frequency signals across a plurality of channels in a radio-frequency band. The method can include receiving, by one or more processors of the wireless circuitry, performance metric data associated with at least a portion of the plurality of channels. The method can include determining, by the one or more processors, noise floor values each associated with one or more channels in the plurality of channels based on the received performance metric data. The method can include detecting, by the one or more processors, narrowband interference of the wireless circuitry based on the noise floor values. Detecting the narrowband interference based on the noise floor values can include detecting a range of the noise floor values, comparing the range with a threshold value, and detecting the narrowband interference in response to the range being greater than the threshold value.

An aspect of the disclosure provides a non-transitory computer-readable storage medium storing one or more computer-executable instructions. The non-transitory computer-readable storage medium can include instructions to determine performance metric data for a plurality of channels across which radio-frequency signals are conveyed using wireless circuitry. The non-transitory computer-readable storage medium can include instructions to detect a loss of sensitivity of the wireless circuitry caused by radio-frequency interference. The non-transitory computer-readable storage medium can include instructions to identify the radio-frequency interference as wideband interference affecting each channel in the plurality of channels or as narrowband interference affecting a subset of channels in the plurality of channels based on the determined performance metric data. The non-transitory computer-readable storage medium can include instructions to mitigate the loss of sensitivity of the wireless circuitry based on an average noise floor value across the plurality of channels in response to identifying the radio-frequency interference as the wideband interference. The non-transitory computer-readable storage medium can include instructions to mitigate the loss of sensitivity of the wireless circuitry based on a minimum noise floor value across the plurality of channels in response to identifying the radio-frequency interference as the narrowband interference.

DETAILED DESCRIPTION

Figure 1:
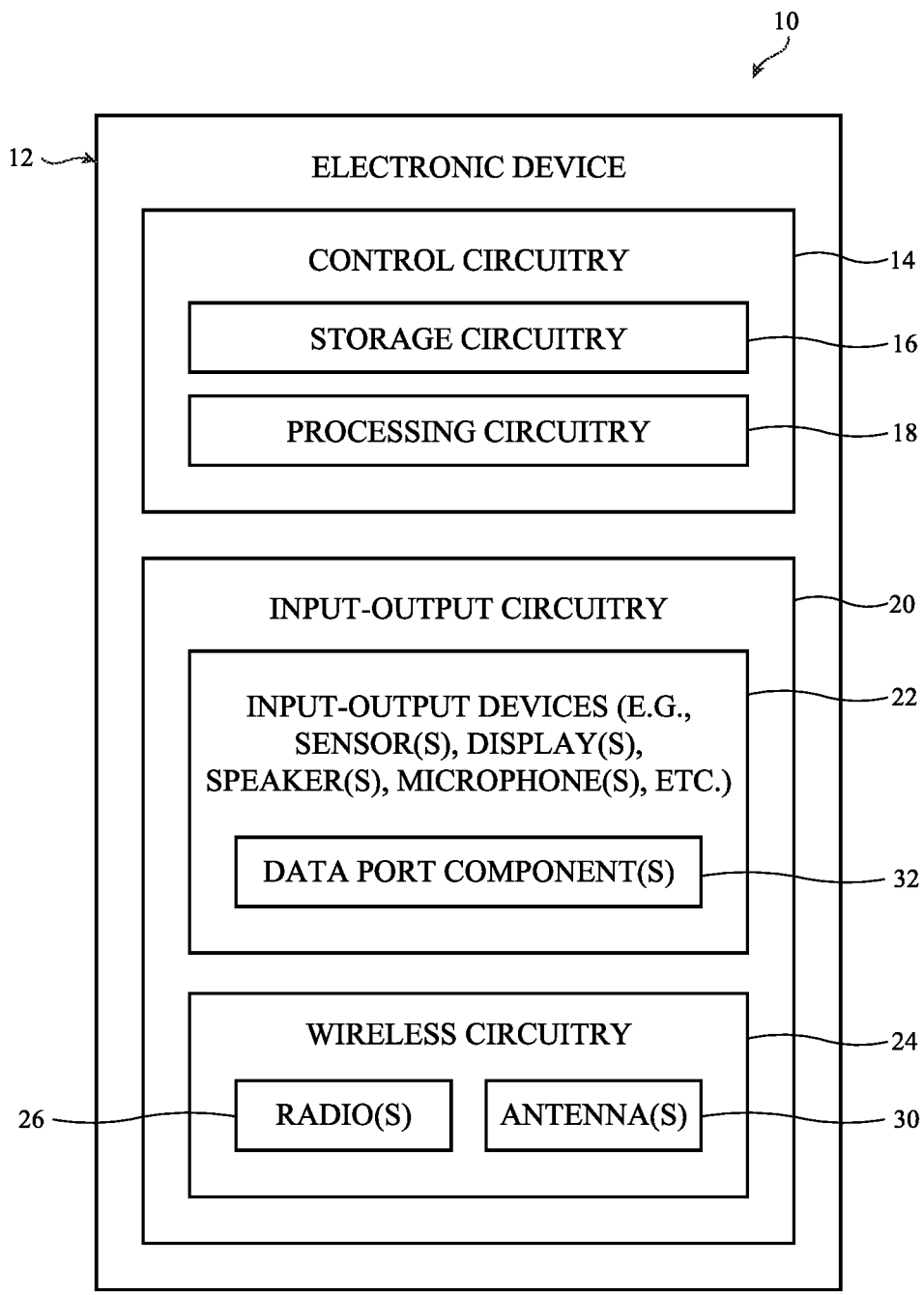
FIG. 1 is a block diagram of an illustrative electronic device having wireless circuitry in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications and/or radio-based spatial ranging operations. Wireless circuitry 24 may include one or more antennas 30. Wireless circuitry 24 may also include one or more radios 26. Each radio 26 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 30. The components of each radio 26 may be mounted onto a respective substrate or integrated into a respective integrated circuit, chip, package (e.g., system-in-package), or system-on-chip (SOC). If desired, the components of multiple radios 26 may share a single substrate, integrated circuit, chip, package, or SOC.

Antenna(s) 30 may be formed using any desired antenna structures. For example, antenna(s) 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 30 over time.

Transceiver circuitry in radios 26 may convey radio-frequency signals using one or more antennas 30 (e.g., antenna(s) 30 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 30 may transmit the radio-frequency signals by radiating the radio-frequency signals into free space (or to free space through intervening device structures such as a dielectric cover layer). Antenna(s) 30 may additionally or alternatively receive the radio-frequency signals from free space (e.g., through intervening devices structures such as a dielectric cover layer). The transmission and reception of radio-frequency signals by antenna(s) 30 each involve the excitation or resonance of antenna currents on an antenna resonating element in the antenna by the radio-frequency signals within the frequency band(s) of operation of the antenna.

Radios 26 may use antenna(s) 30 to transmit and/or receive radio-frequency signals within different frequency bands at radio frequencies (sometimes referred to herein as communications bands or simply as a "bands"). The frequency bands handled by radios 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Each radio 26 may transmit and/or receive radio-frequency signals according to a respective radio access technology (RAT) that determines the physical connection methodology for the components in the corresponding radio. One or more radios 26 may implement multiple RATs if desired. As just one example, the radios 26 in device 10 may include a UWB radio for conveying UWB signals using one or more antennas 30, a Bluetooth (BT) radio for conveying BT signals using one or more antennas 30, a Wi-Fi radio for conveying WLAN signals using one or more antennas 30, a cellular radio for conveying cellular telephone signals using one or more antennas 30 (e.g., in 4G frequency bands, 5G FR1 bands, and/or 5G FR2 bands), an NFC radio for conveying NFC signals using one or more antennas 30, and a wireless charging radio for receiving wireless charging signals using one or more antennas 30 for charging a battery on device 10. This example is merely illustrative and, in general, radios 26 may include any desired combination of radios for covering any desired combination of RATs.

Radios 26 may use antenna(s) 30 to transmit and/or receive radio-frequency signals to convey wireless communications data between device 10 and external wireless communications equipment (e.g., one or more other devices such as device 10, a wireless access point or base station, etc.) via communications link(s). Wireless communications data may be conveyed by radios 26 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc. Radios 26 may also use antenna(s) 30 to perform spatial ranging operations (e.g., for identifying a distance between device 10 and an external object). Radios 26 that perform spatial ranging operations may include radar circuitry if desired (e.g., frequency modulated continuous wave (FMCW) radar circuitry, OFDM radar circuitry, FSCW radar circuitry, a phase coded radar circuitry, other types of radar circuitry).

Each radio 26 may be communicatively coupled to one or more antennas 30 over one or more radio-frequency transmission lines. As an illustrative example, each radio-frequency transmission line may include a ground conductor and a signal conductor. A corresponding antenna 30 may include an antenna feed having a ground antenna feed terminal coupled to the ground conductor and a positive antenna feed terminal coupled to the signal conductor.

One or more radio-frequency transmission lines may be shared between radios 26 and/or antennas 30 if desired. Radio-frequency front end (RFFE) modules may be interposed on one or more radio-frequency transmission lines. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). Wireless circuitry 24 may include any desired number of antennas 30. Some or all of the antennas 30 in wireless circuitry 24 may be arranged into one or more phased antenna arrays (e.g., for conveying radio-frequency signals over a steerable signal beam). If desired, antenna(s) 30 may be operated using a multiple-input and multiple-output (MIMO) scheme and/or using a carrier aggregation (CA) scheme.

Wireless circuitry 24 can often to operate in the presence of radio-frequency interference from one or more sources both internal to device 10 and external to device 10. The presence of radio-frequency interference may contribute to the loss (decrease) of sensitivity or desensitization (sometimes referred to as desense) of wireless circuitry 24. As an example, wireless circuitry 24 may include a radio receiver, whether implemented as a dedicated receiver or a transceiver. The desensitization of wireless circuitry 24 may be characterized by an increase in noise or noise floor of the radio receiver or generally in one or more receiver channels, thereby causing a decrease in the signal-to-noise ratio (SNR) of the radio receiver.

In some illustrative configurations described herein as an illustrative example, connectors for peripheral devices coupled to device 10 may contribute to the radio-frequency interference affecting the operation of wireless circuitry 24. In particular, as shown in FIG. 1, input-output devices 22 may include one or more data port components 32. Data port components 32 may form the input-output structures to which data connectors and/or ports for peripheral devices are coupled to convey data to and/or from device 10. As examples, data port components 32 may include Universal Serial Bus (USB) ports and/or connectors (associated with USB 3.0, Type A USB, Type B USB, Type C USB, etc.), High-Definition Multimedia Interface (HDMI) ports and/or connectors, Thunderbolt ports and/or connectors, Ethernet ports and/or connectors, audio ports and/or connectors, or any other suitable ports and/or connectors. In scenarios where connectors with insufficient electromagnetic shielding operate to convey data to and from device 10, the signaling rate (data rate) of the connector may coincide with one or more operating frequencies of wireless circuitry 24, thereby introducing interference (noise) to wireless circuitry 24 and causing desensitization of wireless circuitry 24.

Figure 2:
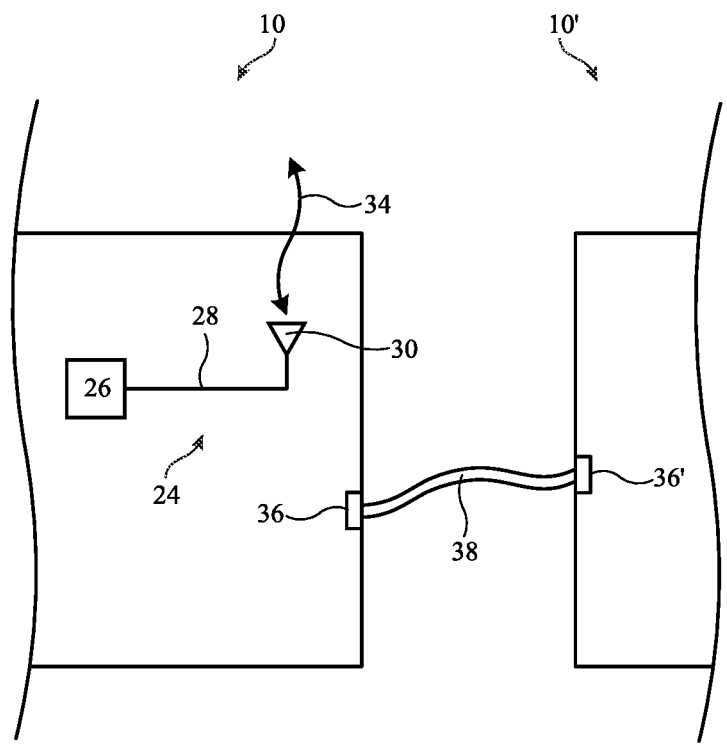
FIG. 2 is a diagram of illustrative wireless circuitry operating in the presence of a source of radio-frequency interference in accordance with some embodiments.

FIG. 2 is an illustrative diagram of device 10 being coupled to external equipment such as peripheral equipment 10' via a connector. As shown in FIG. 2, wireless circuitry 24 of device 10 may include radio 26 coupled to antenna 30 via transmission line 28. Radio 26 and antenna 30 may be configured to convey radio-frequency signals 34 using one or more channels in one or more radio-frequency bands. In parallel, data port components 32 of device 10 may include data port 36 configured receive a data connector 38, through which data is conveyed to and/or from device 10. Data connector 38 may couple data port 36 of device 10 to data port 36' of external equipment 10' (e.g., a device or equipment of the type described in connection with device 10). Data connector 38 may be configured to convey any suitable type of data between device 10 and equipment 10'.

In an illustrative configuration, radio 26 may use antenna 30 to convey radio-frequency signals 34 in wireless personal area network (WPAN) frequency bands such as the 2.4 GHz Bluetooth® band, and connector 38 may be a USB 3.0 connector. In this illustrative configuration, connector 38 may convey data using signaling rate around 5 Gbits per second and may exhibit a data spectrum that overlaps the 2.4 GHz frequency band, thereby interfering with the operation of wireless circuitry 24 such as causing a loss of sensitivity in the radio receiver.

The interference examples described in connection with FIGS. 1 and 2 are merely illustrative. If desired, wireless circuitry 24 may operate in frequency bands other than the 2.4 GHz Bluetooth® band such as wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands other than the 2.4 GHz Bluetooth® band, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), or any other frequency bands. Wireless circuitry 24 operating in these other frequency bands may similarly experience radio-frequency interference from the same connector source and/or from other sources. If desired, non-port and/or non-connector structures (e.g., internal processing circuitry in device 10, internal memory circuitry in device 10, internal interconnect circuitry in device 10, one or more external wireless communication equipment, etc.) may also interfere with the operation of wireless circuitry 24 in the 2.4 GHz Bluetooth® band or any other frequency, leading to desensitization.

Figure 3:
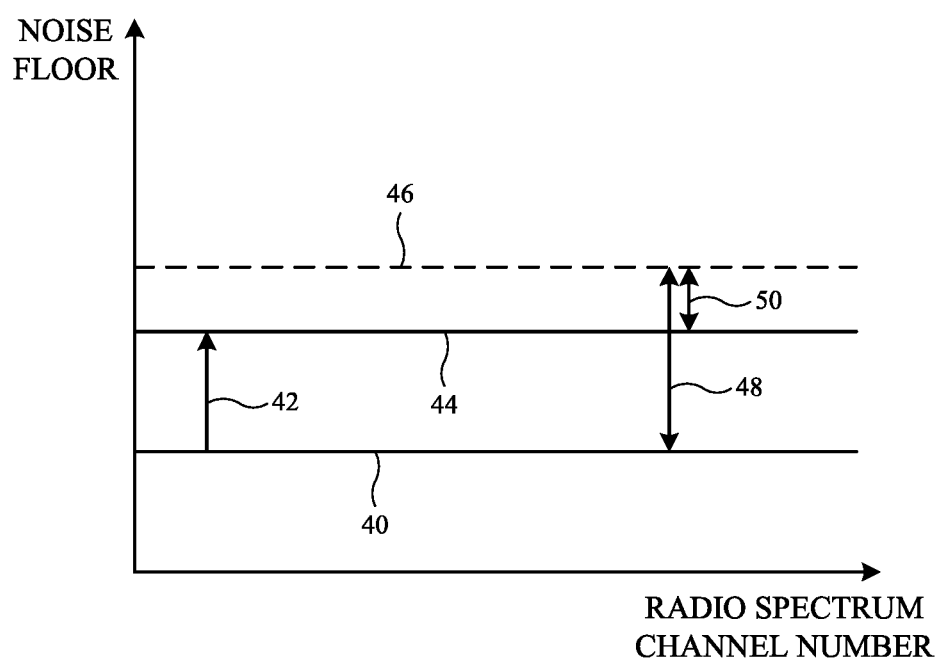
FIG. 3 is an illustrative graph showing the effects of wideband interference in accordance with some embodiments.

FIG. 3 is an illustrative graph showing how wideband interference may impact the operation of the wireless circuitry. As shown in FIG. 3, noise floor for wireless circuitry 24 (e.g., for radio-frequency receiver circuitry, sometimes referred to as a radio receiver) in wireless circuitry 24 is plotted as a function of radio spectrum channel number which represents channels in one or more radio-frequency bands across the radio spectrum. Configurations in which the radio spectrum channel number represents channels in a single radio-frequency band are described herein as illustrative examples for the sake of clarity. If desired, the description herein may be similarly applied to channels in multiple frequency bands.

In the example of FIG. 3, without experiencing interference and desensitization caused by the interference, wireless circuitry 24 in device 10 may exhibit first noise floor values across the channels in a radio-frequency band as indicated by line 40. The first noise floor values may be indicative of a baseline (thermal) noise floor for wireless circuitry 24.

Wireless circuitry 24 may exhibit received signal strength indication (RSSI) values across the channels in the radio-frequency band as indicated by dashed line 46. The difference between each noise floor value and a corresponding RSSI value for the same channel provides the SNR value for that channel.

In the presence of interference, the noise floor of wireless circuitry 24 may be elevated. This elevation is indicated in FIG. 3 by arrow 42 and a corresponding elevated noise floor line 44. As shown in FIG. 3, elevated noise floor line 44 is above noise floor line 40 across each of the channels in the radio-frequency band. Because the interference affects the noise floor of a large number of channels (e.g., greater than 50% of the channels, greater than 75% of the channels, greater than 90% of the channels, greater than 95% of the channels, greater than 99% of the channels, 100% of the channels, etc.) and the noise floor across the entirety of one or more other frequency bands, this type of interference may be referred to as wideband interference. In an illustrative configuration, wideband interference may be caused by the conveyance of data using improperly shielded connector structures, as described in connection with FIG. 2. If desired, other sources may contribute to the wideband interference.

Due to the wideband interference, operation of wireless circuitry 24 will exhibit a lowered SNR across all affected channels in the radio-frequency band than in the scenario where wideband interference does not exist. As an example, without interference, a given channel may exhibit SNR 48, and with interference, the same channel may exhibit SNR 50, which less than SNR 48. This decrease in SNR caused by the corresponding increase in the noise floor may sometimes be referred to as a loss of sensitivity or desensitization of wireless circuitry 24 (e.g., a radio receiver in wireless circuitry 24).

Figure 4:
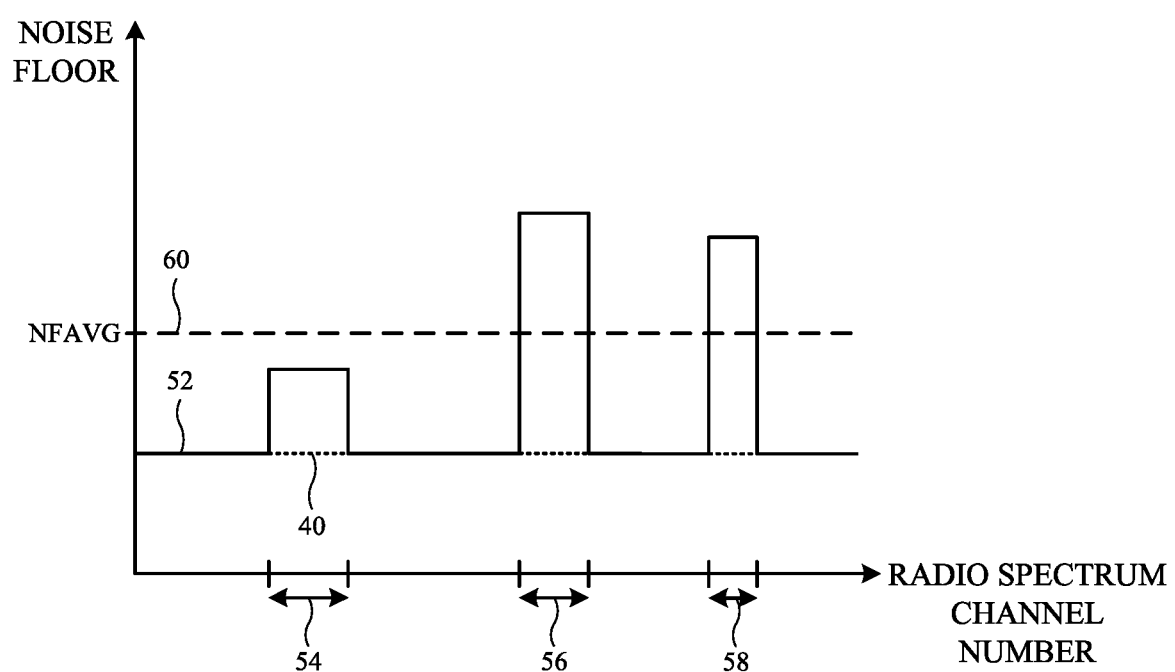
FIG. 4 is an illustrative graph showing the effects of narrowband interference in accordance with some embodiments.

Other types of interference may also affect to the operation of wireless circuitry 24. FIG. 4 is an illustrative graph showing how narrowband interference may impact the operation of the wireless circuitry. As shown in FIG. 4, noise floor for wireless circuitry 24 (e.g., for radio-frequency receiver circuitry) is plotted as a function of radio spectrum channel number which represents channels in one or more radio-frequency bands. Configurations in which the radio spectrum channel number represents channels in a single radio-frequency band are described herein as illustrative examples for the sake of clarity. If desired, the description herein may be similarly applied to channels in multiple frequency bands.

In the example of FIG. 4, in the presence of narrowband interference, wireless circuitry 24 in device 10 may exhibit noise floor values across the channels in a radio-frequency band as indicated by line 52. As illustrated by line 52, some channels such as a first set of channels 54, a second set of channels 56, and a third set of channels 58 may be affected by the narrowband interference and exhibit elevated noise floor values in comparison with a baseline noise floor indicated by line 40. Other channels in the same frequency band may remain unaffected by the narrowband interference in comparison with a baseline noise floor indicated by line 40. In contrast to wideband interference, narrowband interference interferes with the operation of wireless circuitry 24 at only narrow bands of frequencies. The affected channels may make up less than 1% of the channels, less than 5% of the channels, less than 10% of the channels, less than 20% of the channels, less than 30% of the channels, less than 40% of the channels, less than 50% of the channels, etc.

These examples of the different number of affected channels for wideband interference and narrowband interference are merely illustrative. If desired, narrowband interference and wideband interference may be characterized and differentiated in other suitable manners. As an illustrative example, wideband interference for one or more frequency bands of interest may refer to interference exhibited by sources with a bandwidth that is on the order of MHz, tens of MHz, and narrowband interference for the one or more frequency bands of interest may refer to interference exhibited by sources with a bandwidth that is narrower than and is a part of the wideband interference bandwidth. This example is similarly non-limiting.

The graphs in FIGS. 3 and 4 are illustrative of and highlight the features described herein. The baseline noise floor across channels, and the noise floor across the channels in the presence of different types of interference may exhibit other suitable characteristics. If desired, noise floor characteristics from only a subset of channels in a frequency band may be used to identify varying types of interference. If desired, the desensitization of wireless circuitry such as radio-frequency receiver circuitry may be identified and characterized based on sensitivity metrics other than noise floor.

Because interference caused by wideband interference may similarly affect all channels such that noise floor values across all channels may be elevated by a similar amount, desensitization detection or mitigation techniques can make use of the average elevated noise floor values across all of the channels to properly detect and compensate for wideband interference. However, wireless circuitry 24 may also operate in the presence of narrowband interference. If the same desensitization detection and mitigation techniques using the average elevated noise floor across all of the channels is used for narrowband interference, the desensitization of wireless circuitry 24 may not be properly characterized, which can lead to improper mitigation such as unnecessarily performing desensitization mitigation when mitigation is not needed. This can undesirably distort data in one or more channels.

This is further illustrated in the example of FIG. 4. As shown in FIG. 4, dashed line 60 may represent an average noise floor value NFAVG for noise floor values on line 52 across all of the channels in the presence of narrowband interference. Performing desensitization detection and mitigation based on average noise floor value NFAVG may overcompensate for interference in channels previously unaffected by narrowband interference (e.g., channels exhibiting noise floor values on line 40) and undercompensate for interference in channels most affected by narrowband interference (e.g., channels in sets of channels 54, 56, and 58). In essence, it may be detrimental to apply desensitization detection and mitigation techniques for wideband interference to narrowband interference.

Figure 5:
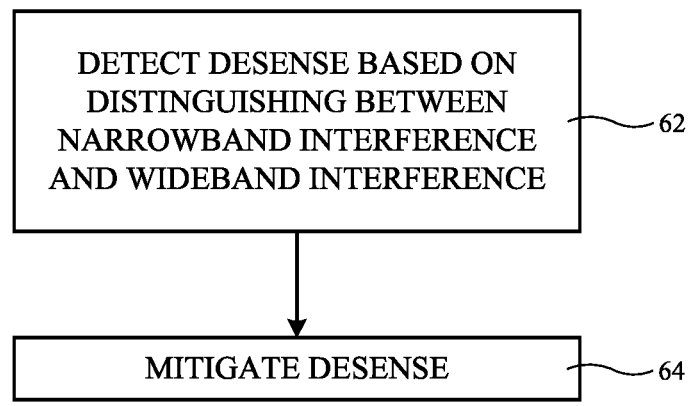
FIG. 5 is a flowchart of illustrative operations for operating wireless circuitry in the presence of wireless circuitry desensitization in accordance with some embodiments.
Figure 6:
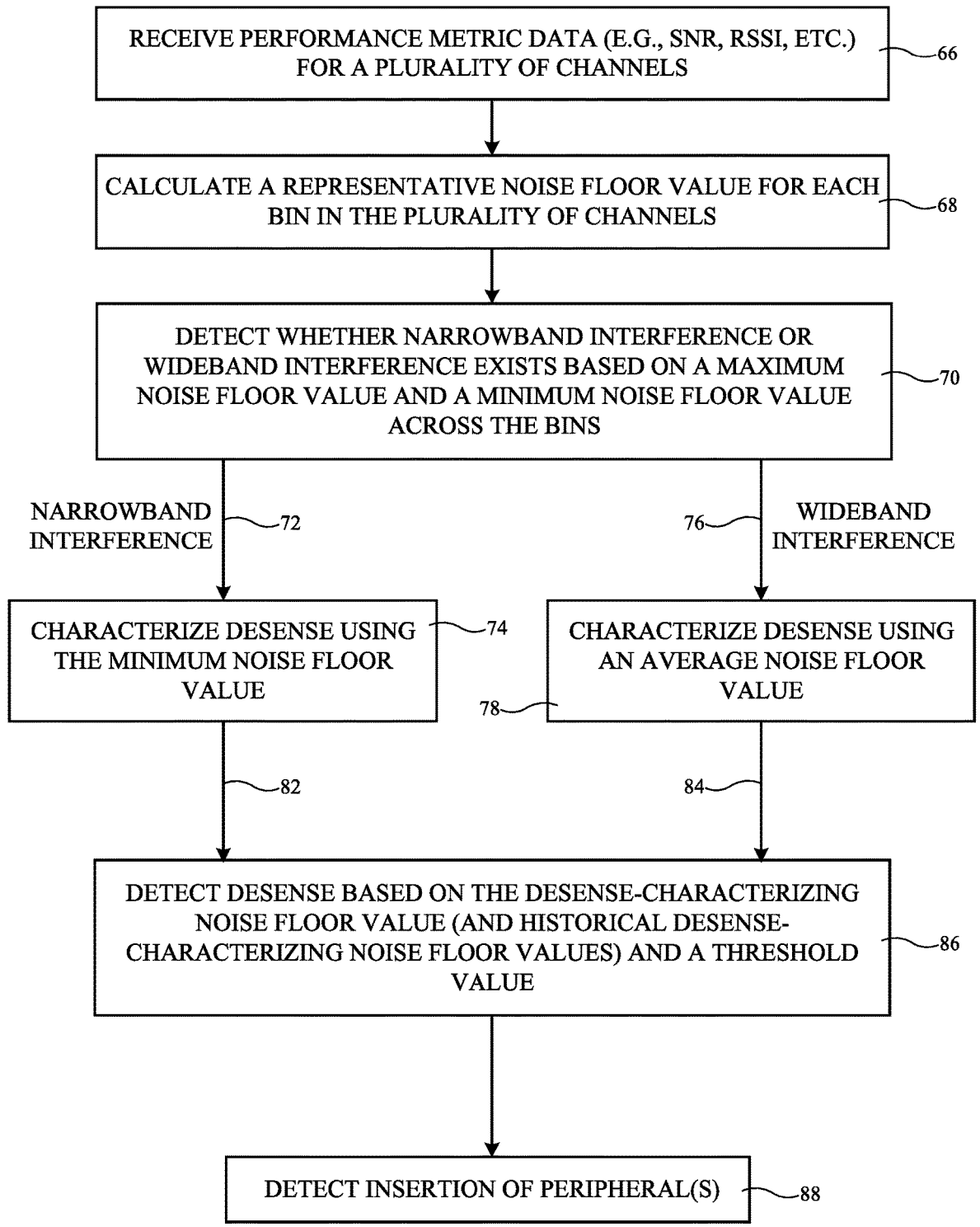
FIG. 6 is a flowchart of illustrative operations for detecting wireless circuitry desensitization based on wideband interference and narrowband interference in accordance with some embodiments.

FIGS. 5 and 6 are illustrative flowcharts for operating wireless circuitry in the possible presence of wideband interference and narrowband interference to detect and mitigate desensitization of wireless circuitry such as radio-frequency receiver circuitry caused by either type of interference. One or more operations (e.g., all of the operations) in FIGS. 5 and 6 may be performed by wireless circuitry 24 implemented on one or more processors such as those implementing processing circuitry 18, radios 26, etc. (in FIG. 1). In particular, software code, sometimes referred to as instructions, for performing these operations in device 10 may be stored on corresponding storage circuitry such as storage circuitry 16 in FIG. 1 (a non-transitory (tangible)

computer-readable storage medium). The one or more processors of wireless circuitry 24 may execute or process the stored software code to perform these operations.

As shown in FIG. 5, at operation 62, one or more processors of wireless circuitry 24 may detect desensitization (of the radio receiver in wireless circuitry 24) based on distinguishing or discriminating between narrowband interference and wideband interference. Because narrowband interference and wideband interference affect wireless circuitry 24 in different manners (e.g., affects different numbers of channels, exhibit different bandwidths of interference, etc.), wireless circuitry 24 may characterize and detect the desensitization caused by the two different types of interference differently.

Consider an illustrative scenario where wireless circuitry 24 operates in the presence of narrowband interference, wireless circuitry 24 may continue with normal operation (e.g., without desensitization mitigation) because a majority of channels in a frequency band remain unaffected, and/or a majority of channels in the frequency band exhibit satisfactory behavior (exhibit a satisfactory SNR). In some configurations such as when the narrowband interference comes from a transient source such as a source not fixed to device 10, wireless circuitry 24 may similarly continue with normal operation (e.g., without desensitization mitigation) as the interference source may last a relatively short amount of time (e.g., on the order of seconds or minutes), and thereafter, the desensitization will resolve by itself.

Consider an illustrative scenario wherein wireless circuitry 24 operates in the presence of wideband interference, wireless circuitry 24 may perform desensitization mitigation because a majority of channels in a given frequency band are affected and/or a majority of channels in the frequency band exhibit unsatisfactory behavior (exhibit an unsatisfactory SNR). In some configurations such as when the wideband interference comes from a fixed source such an active connector fixedly coupled to device 10, wireless circuitry 24 may perform desensitization mitigation since it may be unlikely for the desensitization to resolve itself in a short amount of time as the interference will persist for a longer amount of time (e.g., as along as the connector is in use, on the order of minutes or hours, etc.).

These scenarios and configurations above illustrate the differences between narrowband and wideband interference and their impacts on the desensitization of wireless circuitry 24. In other words, in some scenarios, narrowband interference may not need to trigger desensitization mitigation, while in other scenarios, wide interference may need to trigger desensitization mitigation.

As highlighted by the examples above, it may be desirable to distinguish between narrowband and wideband interference in order to more accurately characterize and detect desensitization. In particular, operation 62 may be exemplified by the operations in FIG. 6. In other words, in an illustrative configuration for performing the desensitization detection in operation 62, wireless circuitry 24 may perform one or more (e.g., all) of the operations in FIG. 6.

As shown in FIG. 6, at operation 66, one or more processors of wireless circuitry 24 may receive performance metric data (sometimes referred to as performance statistics) for a plurality of channels in a frequency band. Illustrative performance metric data may include signal-to-noise radio (SNR) data, received signal strength indicator (RSSI) data, other information or data indicative of these types of data, or other information or data indicative of the sensitivity of wireless circuitry 24.

As an illustrative example, the one or more processors may include a radio component (e.g., a radio receiver in wireless circuitry 24) coupled to one or more antennas 30 operating in the frequency band using the plurality of channels. The radio component may generate, gather, receive, or determine the performance metric data based on the operation of the one or more antennas and/or based on the operation of one or more sensors coupled to the one or more antennas. If desired, the radio component may be separate from the one or more processors, and the one or more processors may receive the performance metric data generated or received by the radio component to perform operation 66.

In some illustrative configurations, the one or more processors may receive performance metric data for each channel in the frequency band. In other illustrative configurations, the one or more processors may receive performance metric data for only a subset of channels in the frequency band (e.g., because the performance metric data may be not be available or may not have been gathered, because the performance metric data for one or more channels may be irrelevant or unnecessary to discriminate between narrowband interference and wideband interference, etc.). In other words, the one or more processors may perform operation 66 by receiving or determining any suitable amount of performance metric data (e.g., without gathering or receiving performance metric data for each channel in the frequency band).

At operation 68, one or more processors of wireless circuitry 24 may define subsets (or bins) of adjacent channels in the frequency band and calculate a representative noise floor value for each bin of channels.

As an illustrative example, the 2.4 GHz Bluetooth® band may include 80 channels, which can be divided into 20 bins, each including 4 adjacent channels. More explicitly, channels 1-4 may be associated with a first bin, channels 5-8 may be associated with a second bin, channels 9-12 may be associated with a third bin, etc. Performance metric data such as SNR and RSSI may be determined or received for each channel (at operation 66) and an average of the performance metric data may be taken across the four channels in each bin to generate the representative (average) performance data for that bin (e.g., a representative average RSSI value and a representative average SNR value). For each bin, the representative SNR value may be subtracted from the RSSI value to obtain the representative (average) noise floor value for that bin.

If desired, instead of taking a single average noise floor value as the representative noise floor value, a running average of the single average noise floor value and one or more historical average noise floor values for the same bin may be used. As an example, a running average across five seconds may be calculated using the single average noise floor value and the four previous historical average noise floor values for the same bin in the scenario where average noise floor values are calculated every second. If desired, any time duration and periodicity may be used to obtain the running average of the single average noise floor value.

In such a manner, wireless circuitry 24 may calculate representative noise floor values for the bins (e.g., obtained using a running average or as the single value). In some illustrative configurations, performance metric data for certain channels and/or bins may not be obtained. In other words, if desired, the one or more processors may perform operation 68 by calculating (or determining) the representative noise floor value for any suitable number of channels and/or bins (e.g., without calculating or determining the representative noise floor value for each channel or each bin in the frequency band). If desired, the representative noise floor values for one or more bins may be obtained using other suitable manners (e.g., using an average of only channels with known or reliable performance metric data). If desired, the other performance metric data or information may be used to determine the noise floor values.

After calculating or determining the representative noise floor values for the bins of channels, one or more processors of wireless circuitry 24 may identify characteristics of the representative noise floor values. As examples, the representative noise floor values for the bins may exhibit a maximum noise floor value, a minimum noise floor value, and an average noise floor value. The one or more processors of wireless circuitry 24 may identify a maximum noise floor value, a minimum noise floor value, an average noise floor value, any other suitable values associated with the representative noise floor values for the bins of channels.

At operation 70, one or more processors of wireless circuitry 24 may discriminate between wideband interference and narrowband interference based on characteristics of the representative noise floor values for the bins of channels. In particular, the one or more processors may compare the difference (e.g., the absolute difference or separation) between the maximum noise floor value and the minimum noise floor value (e.g., the range of the representative noise floor values) with a narrowband threshold value (a bandwidth threshold value) to determine whether the interference causing desensitization of wireless circuitry 24 is wideband interference or narrowband interference.

In particular, as described in connection with FIG. 3, wideband interference may more evenly elevate the noise floor across the different channels and therefore the different bins. As such, the difference between the maximum noise floor value across the bins and the minimum noise floor value across the bins should be relatively small. In contrast, as described in connection with FIG. 4, narrowband interference may elevate the noise floor unevenly between different channels and therefore different bins. As such, the difference between the maximum noise floor value across the bins and the minimum noise floor value across the bins should relatively large.

Accordingly, the difference between the maximum noise floor value and the minimum noise floor value being less than the narrowband threshold value may be indicative of wideband interference. The difference between the maximum noise floor value and the minimum noise floor value being greater than the narrowband threshold value may be indicative of narrowband interference. As an illustrative example, the narrowband threshold value may be 6 dB, a value between 5-7 dB, a value between 4-8 dB, or may be any suitable value.

In the scenario where the difference is greater than the narrowband threshold value and narrowband interference is present, processing may proceed via path 72 and wireless circuitry 24 may perform operation 74. At operation 74, one or more processors of wireless circuitry 24 may characterize the desensitization and perform desensitization detection using the minimum noise floor value across the bins. This may be done because the majority of channels may exhibit noise floor values around the minimum floor value and only a small portion of channels may exhibit elevated noise floor values significantly above the minimum floor value.

In the scenario where the difference is less than the narrowband threshold value and wideband interference is present, processing may proceed via path 76 and wireless circuitry 24 may perform operation 78. At operation 78, one or more processors of wireless circuitry 24 may characterize the desensitization and perform desensitization detection using the average noise floor value across the bins. This may be done because the majority of channels will exhibit noise floor values around the average noise floor value.

After identifying the desense-characterizing noise floor value such as the minimum noise floor value across the bins for narrowband interference or the average noise floor value across the bins for the wideband interference, wireless circuitry 24 may proceed along the corresponding path 82 or 84. At operation 86, one or more processors of wireless circuitry 24 may perform detect desensitization using the desense-characterizing noise floor value. In particular, the desense-characterizing noise floor value may be compared to a desensitization threshold value, which determines whether significant desensitization exists and/or whether desensitization mitigation should be performed. In the case of narrowband interference, the minimum noise floor value across the bins may be compared to the desensitization threshold value, while in the case of wideband interference, the average noise floor value across the bins may be compared to the desensitization threshold value. If the desense-characterizing noise floor value is greater than the desensitization threshold value, significant desensitization may exist and/or desensitization mitigation may be engaged. As examples, the desensitization threshold value may be −80 dBm, a value between −79 and −81 dBm, a value between −75 and −85 dBm, or may be any suitable value.

If desired, a sliding window filter may be applied operation 86. Rather than using a single desense-characterizing noise floor value to detect desensitization, one or more processors of wireless circuitry 24 may use the single desense-characterizing noise floor value and additional historical desense-characterizing noise floor values to determine whether significant desensitization exists and/or whether desensitization mitigation should be performed.

In an illustrative configuration, the one or more processors of wireless circuitry 24 may determine the desense-characterizing noise floor value every second, and the sliding time window may be for five seconds. As such, five desense-characterizing noise floor values (e.g., the desense-characterizing noise floor value for the current one second cycle and four additional historical desense-characterizing noise floor value generated in the previous four one second cycles) may be used to detect desensitization by comparing each of the five values to the desensitization threshold value. In accordance with the sliding window filter, once a new desense-characterizing noise floor value is calculated, it replaces the oldest of the historical desense-characterizing noise floor values, such that the set of desense-characterizing noise floor values being compared with the desensitization threshold value is in a continually sliding temporal window of fixed duration.

As a first example of the above configuration (during a first time period), the desensitization threshold value may be −80 dBm, and the five noise floor values in the sliding temporal window may be {−90 dBm, −66 dBm, −91 dBm, −70 dBm, −82 dBm}. Because all of the values in the sliding window of noise floor values (e.g., −90 dBm, −91 dBm, and −82 dBm) are not greater than the desensitization threshold value (e.g., −80 dBm), no significant desensitization warranting mitigation is detected. As a second example (during a first time period), the desensitization threshold value may be −80 dBm, and the five noise floor values may be {−79 dBm, −78 dBm, −75 dBm, −79 dBm, −65 dBm}. Because all of the values in the sliding window of noise values are greater than the desensitization threshold value, significant desensitization warranting mitigation is detected.

By using the sliding window filter, confidence in desensitization detection may be improved. If desired, a storage circuit such as a first-in-first-out storage circuit (implemented as a portion of storage circuitry 16) may be used to store and update the historical and current desense-characterizing noise floor values for comparison with the desensitization threshold value.

At operation 88, one or more processors of wireless circuitry 24 may detect the physical insertion of a peripheral device via a connector to confirm the source of interference. This may help confirm that (wideband) interference exists and/or the connector is a likely source for the interference.

One or more processors of wireless circuitry 24 may operate based on operations 66-88 in FIG. 6 with any suitable periodicity (e.g., every 1 s, every 5 s, etc.,), based on any suitable triggering events (e.g., sensor data indicating radio-frequency interference is present or likely present), in connection with other operations (e.g., may operate continuously in the background), or in any other suitable manner. Operations 66-88 in FIG. 6 are merely illustrative. If desired, one or more operations may be modified, omitted, performed in parallel with other operations, or updated in any suitable manner. If desired, radio-frequency sensitivity metrics other than noise floor values may be used discriminate between wideband interference and narrowband interference.

Referring back to FIG. 5, after performing operation 62 (e.g., performing operations 66-88 in FIG. 6), one or more processors of wireless circuitry 24 may perform desensitization mitigation at operation 64. In particular, wireless circuitry 24, in response to determining that desensitization mitigation is needed, may enter a desensitization mitigation mode or maintain operation in the desensitization mitigation mode if already operating in the desensitization mitigation mode. Operations performed during desensitization mitigation may be dependent on the noise floor level, the type of interference, and/or other factors.

As examples for desensitization mitigation, one or more processors of wireless circuitry 24 may avoid operations in certain frequency bands and/or certain channels in certain frequency bands, avoid operation affected portions of wireless circuitry 24, switch operation from affected portions of wireless circuitry 24 to other portions of wireless circuitry 24, operate affected portions of wireless circuitry 24 in a high-power mode, etc.

Figure 7:
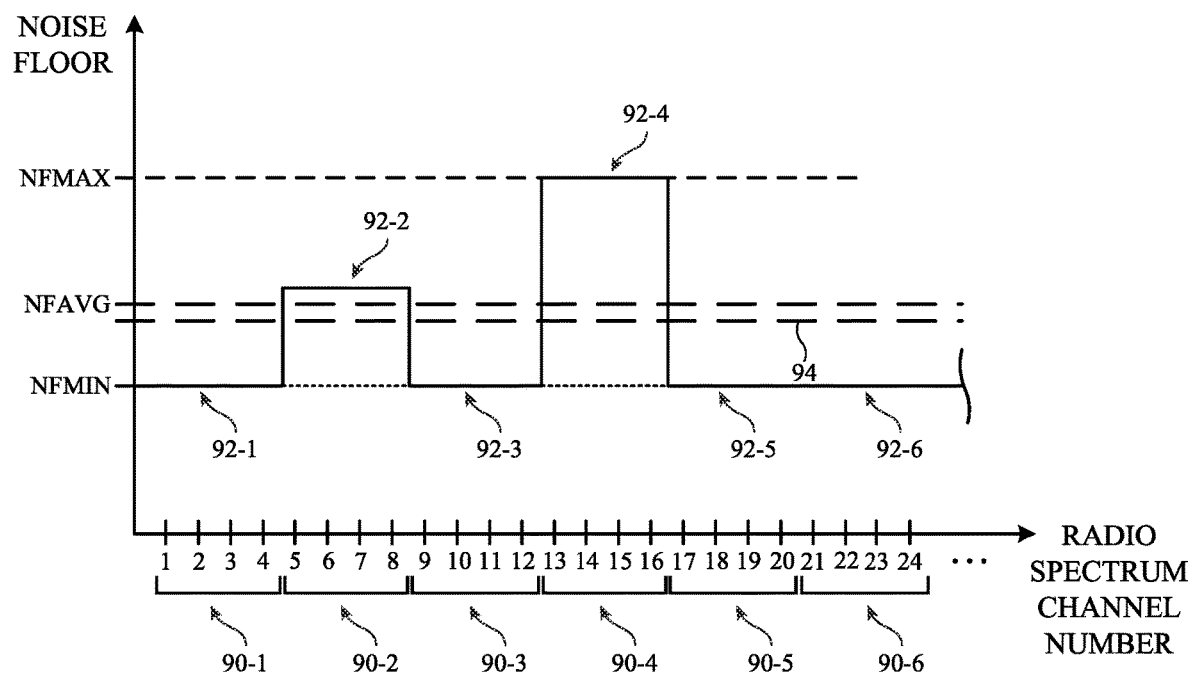
FIG. 7 is an illustrative graph showing noise floor characteristics useable to detect wireless circuitry desensitization in accordance with some embodiments.

FIG. 7 is an illustrative graph showing illustrative noise floor characteristics useable to detect desensitization as described in connection with FIG. 6. As an example, wireless circuitry 24 may operate in a plurality of channels associated with one or more radio-frequency frequency bands. As shown in FIG. 7, channels 1-4 may be associated with bin 90-1. Bin 90-1 may have a representative noise floor value 92-1 such as a value that is an average of the four corresponding noise floor values of channels 1-4. Channels 5-8 may be associated with bin 90-2. Bin 90-2 may have a representative noise floor value 92-2 such as a value that is an average of the four corresponding noise floor values of channels 5-8. Channels 9-12 may be associated with bin 90-3. Bin 90-3 may have a representative noise floor value 92-3 such as a value that is an average of the four corresponding noise floor values of channels 9-12. Channels 13-16 may be associated with bin 90-4. Bin 90-4 may have a representative noise floor value 92-4 such as a value that is an average of the four corresponding noise floor values of channels 13-16. Channels 17-20 may be associated with bin 90-5. Bin 90-5 may have a representative noise floor value 92-5 such as a value that is an average of the four corresponding noise floor values of channels 17-20. Channels 21-24 may be associated with bin 90-6. Bin 90-6 may have a representative noise floor value 92-6 such as a value that is an average of the four corresponding noise floor values of channels 17-20.

In the example of FIG. 7, noise floor value 92-4 for bin 90-4 may be the maximum noise floor value NFMAX across all of the bins, and noise floor value 92-1 for bin 90-1 (and noise floor values 92-3, 92-5, and 92-6) may be the minimum noise floor value NFMIN across all of the bins. The difference between minimum noise floor value NFMIN and maximum noise floor value NFMAX may be greater than a narrowband threshold value and may therefore indicate that narrowband interference is present.

Because narrowband interference is detected, wireless circuitry 24 may use minimum noise floor value NFMIN to determine whether significant desensitization exists to warrant performing desensitization mitigation. Line 94 may be indicative of a desensitization threshold value. Since noise floor value NFMIN is less than the desensitization threshold, wireless circuitry 24 may operate normally without performing desensitization mitigation.

By identifying or classifying interference as narrowband interference and/or wideband interference, wireless circuitry 24 may perform desensitization mitigation only when appropriate. In the scenario where a noise floor averaging method is used, the average noise floor value NFAVG (instead of the minimum noise floor value NFMIN) may be compared to the desensitization threshold value indicated by line 94. Since the average noise floor value NFAVG is greater than the desensitization threshold value, desensitization may be improperly characterized and desensitization mitigation may be undesirably performed, resulting in suboptimal operations (e.g., when unneeded excess power is being used to convey radio-frequency signals, functional antennas may be switched out of use, etc.). By discriminating between narrowband interference and wideband interference and detecting desensitization based on the corresponding desense-characterizing noise floor value, wireless circuitry 24 may properly mitigate desensitization, while accounting for narrowband interference.

As described in the example of FIG. 2, interfering connector 38 coupled to port 36 may expectedly cause wideband interference and desensitization, while the nearby presence of other radio-frequency sources may cause narrowband interference. Accordingly, in this scenario, if wideband interference is identified, the wireless circuitry may infer the presence of interfering connector 38, and if narrowband interference is identified as well, the wireless circuitry may infer the presence of the nearby presence of other radio-frequency sources cause narrowband interference. By identifying the types of sources and their interference, the wireless circuitry can perform desensitization mitigation appropriately.

The foregoing is merely illustrative and various modifications can be made to the described embodiments. The foregoing embodiments may be implemented individually or in any combination.

What is claimed is:

1. An electronic device comprising:
   one or more antennas;
   wireless circuitry configured to use the one or more antennas to receive radio-frequency signals across a plurality of channels;
   a data port; and one or more processors configured to
  receive performance metric data associated with at least a portion of the plurality of channels, and
  mitigate desensitization of the wireless circuitry based at least in part on:
    whether the performance metric data is indicative of narrowband interference or wideband interference, and
    whether an external connector is coupled to the data port.

2. The electronic device of claim 1, wherein the one or more processors are configured to calculate a set of average noise floor values based on the performance metric data, each average noise floor value being associated with a bin of channels in the plurality of channels.

3. The electronic device of claim 2, wherein each bin of channels comprises two or more channels in the plurality of channels.

4. The electronic device of claim 2, wherein the average noise floor values have a maximum noise floor value and a minimum noise floor value and the one or more processors are configured to determine whether the performance metric data is indicative of the narrowband interference or the wideband interference based on the maximum noise floor value and the minimum noise floor value.

5. The electronic device of claim 4, wherein the one or more processors are configured to compare a difference between the maximum noise floor value and the minimum noise floor value to a bandwidth threshold value and determine whether the performance metric data is indicative of the narrowband interference or the wideband interference based on the comparison.

6. The electronic device of claim 5, wherein the difference being greater than the bandwidth threshold value indicates that the performance metric data is indicative of the narrowband interference and the difference being less than the bandwidth threshold value indicates that the performance metric data is indicative of the wideband interference.

7. The electronic device of claim 1, wherein the one or more processors are configured to mitigate the desensitization of the wireless circuitry using a first noise floor value based on the performance metric data being indicative of the narrowband interference.

8. The electronic device of claim 7, wherein the one or more processors are configured to mitigate the desensitization of the wireless circuitry using a second noise floor value different than the first noise floor value based on the performance metric data being indicative of the wideband interference.

9. The electronic device of claim 8, wherein the first noise floor value is a minimum noise floor value across the plurality of channels and the second noise floor value is an average noise floor value across the plurality of channels.

10. The electronic device of claim 8, wherein the one or more processors are configured to mitigate the desensitization of the wireless circuitry based on a comparison of the first noise floor value or the second noise floor value to a desensitization threshold value.

11. The electronic device of claim 1, wherein the one or more processors are configured to mitigate the desensitization of the wireless circuitry by avoiding operation in one or more channels of the plurality of channels.

12. The electronic device of claim 1, wherein the one or more processors are configured to mitigate the desensitization of the wireless circuitry by avoiding operation of a portion of the wireless circuitry.

13. The electronic device of claim 1, wherein the one or more processors are configured to mitigate the desensitization of the wireless circuitry by switching operation from a first portion of the wireless circuitry to a second portion of the wireless circuitry.

14. The electronic device of claim 1, wherein the one or more processors are configured to mitigate the desensitization of the wireless circuitry by operating a portion of the wireless circuitry in a high-power mode.

15. A method of handling radio-frequency interference, the method comprising:
  receiving, by one or more processors, radio-frequency signals across a plurality of channels;
  calculating, by the one or more processors, an average noise floor value across two or more channels in the plurality of channels; and
  operating, by the one or more processors, wireless circuitry in a desensitization mitigation mode of operation based on narrowband interference detected using the average noise floor value.

16. The method of claim 15, wherein the narrowband interference is detected by calculating a difference between the average noise floor value and an additional average noise floor value across two or more additional channels in the plurality of channels.

17. The method of claim 16, wherein the difference being greater than a threshold value is indicative of the narrowband interference.

18. Wireless circuitry comprising:
  one or more processors configured to
    calculate a first average noise floor value across a first set of radio-frequency channels in a plurality of radio-frequency channels,
    calculate a second average noise floor value across a second set of radio-frequency channels in the plurality of radio-frequency channels, and
    operate in a desensitization mitigation mode of operation based on a comparison between the first average noise floor value and the second average noise floor value.

19. The wireless circuitry defined in claim 18, wherein the one or more processors are configured to discriminate between wideband interference and narrowband interference based on the comparison and operate in the desensitization mitigation mode of operation based on the discrimination between the wideband interference and the narrowband interference.

20. The wireless circuitry defined in claim 18, wherein the one or more processors are configured to operate in the desensitization mitigation mode of operation at least by avoiding operation in a given radio-frequency channel, switching operation from first circuitry to second circuitry, or operating affected circuitry in a high-power mode.

* * * * *